(12) United States Patent
Wertheim et al.

(10) Patent No.: US 11,035,731 B1
(45) Date of Patent: Jun. 15, 2021

(54) MULTI-PURPOSE SURVEY SPECTRORADIOMETER WHICH IS ALSO USED AS A TRANSMITTANCE AND REFLECTANCE SPECTROMETER

(71) Applicants: Herbert Alvin Wertheim, Miami, FL (US); Phillip Richard Bartick, II, Miami, FL (US); William Franklin Moore, Miami, FL (US)

(72) Inventors: Herbert Alvin Wertheim, Miami, FL (US); Phillip Richard Bartick, II, Miami, FL (US); William Franklin Moore, Miami, FL (US)

( * ) Notice: Subject to any disclaimer, the term of this patent is extended or adjusted under 35 U.S.C. 154(b) by 0 days.

(21) Appl. No.: 16/800,397

(22) Filed: Feb. 25, 2020

(51) Int. Cl.
| | | |
|---|---|---|
| *G01J 3/02* | (2006.01) | |
| *G01J 3/457* | (2006.01) | |
| *G01J 3/36* | (2006.01) | |
| *G01J 3/28* | (2006.01) | |

(52) U.S. Cl.
CPC .............. *G01J 3/457* (2013.01); *G01J 3/0256* (2013.01); *G01J 3/36* (2013.01); *G01J 2003/2866* (2013.01)

(58) Field of Classification Search
CPC .. G01J 3/457; G01J 3/36; G01J 3/0256; G01J 2003/2866; G01J 3/28; G01J 3/18; G01J 3/02; G01J 1/32; G06F 15/00
See application file for complete search history.

(56) References Cited

U.S. PATENT DOCUMENTS

2018/0109783 A1* 4/2018 Austin ................... G01J 3/506

\* cited by examiner

*Primary Examiner* — Abdullahi Nur

(57) ABSTRACT

A compact spectroradiometric device with a digital data processing system used to determine the spectral irradiance, illuminance, chromaticity, correlated color temperature, color rendering, flicker, equivalent melanopic lux and other characteristics of a light source as well as those same characteristics as observed in the transmittance through or reflectance from a sample being illuminated by that light source is described.

3 Claims, 1 Drawing Sheet

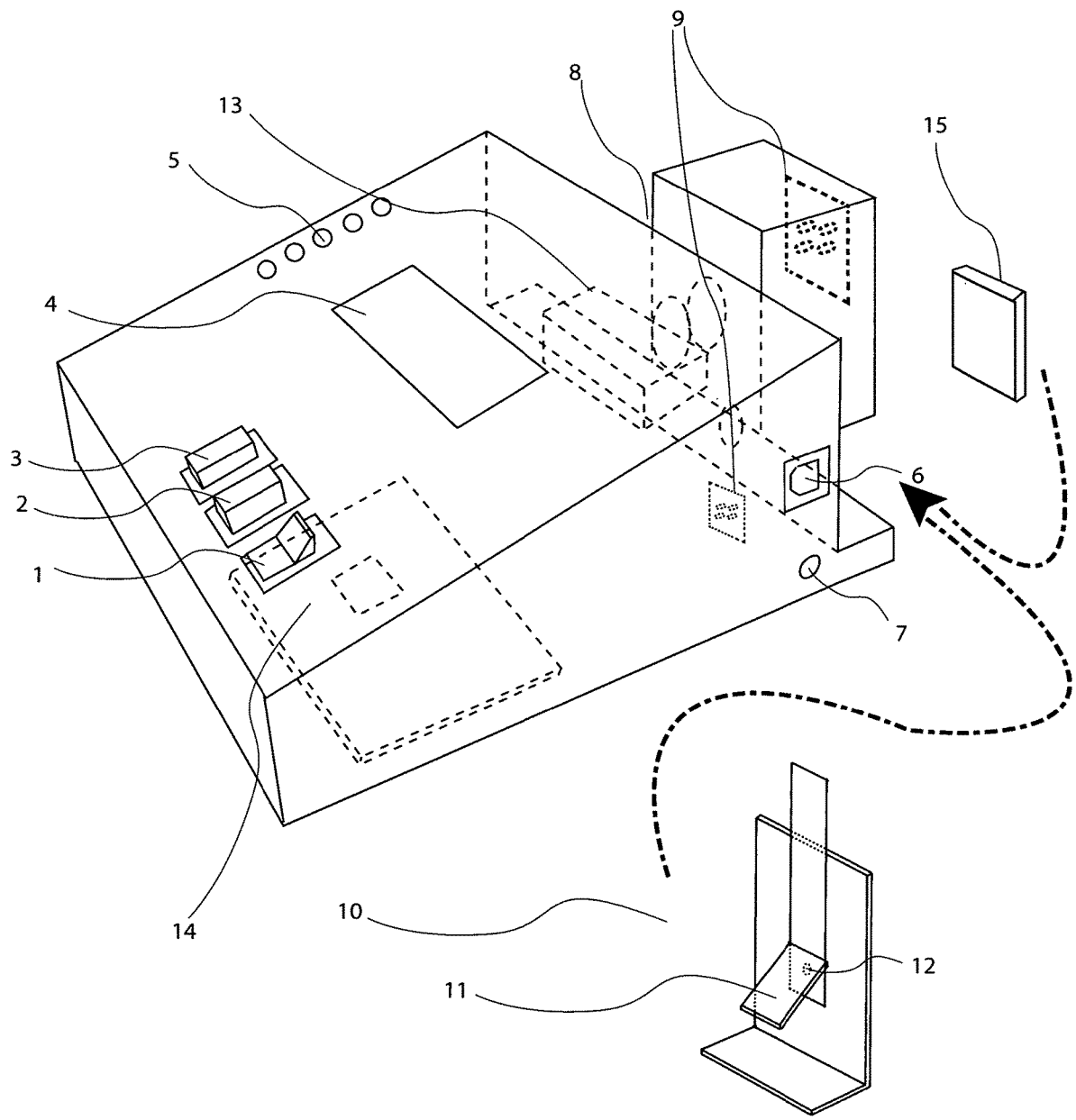

MULTI-PURPOSE SURVEY SPECTRORADIOMETER WHICH IS ALSO USED AS A TRANSMITTANCE AND REFLECTANCE SPECTROMETER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENTIAL LISTING, A TABLE, OR A COMPUTER PROGRAM LISTING COMPACT DISC APPENDIX

Not Applicable

BACKGROUND OF THE INVENTION

1. Field of the Invention

The invention relates to a compact device used to determine the spectral irradiance and color characteristics of a light source as well as the transmittance and reflectance properties of a sample being illuminated by a light source. Although this device will be used by anyone studying illumination, it would be especially applicable to the optometric field where tinted lens samples and the sources of light illuminating them must be evaluated for the user's comfort and optimal visual performance.

2. Background of the Related Art

Reflection spectrometers, where a radiation source of known characteristic illuminates an object and the returning radiation's reflected spectrum is recorded are well known. Some recent patented refinements and special applications include those taught by Berg, et al. (U.S. Pat. No. 5,387,977) and Stewart (U.S. Pat. No. 9,626,557).

Combined reflection and transmission spectrometers, where radiation from a source of known characteristic passes through or is reflected from a sample and the resultant radiation's spectrum is recorded are also well known. Some recent patented refinements and special applications include those taught by Kawagoe, et al. (U.S. Pat. No. 5,175,697) and Kawate (U.S. Pat. No. 6,914,680).

Radiometers which measure the spectral irradiance of a light source as well as its color characteristics are also well known. Some recent patented refinements and special applications include those taught by Christie, Jr. (U.S. Pat. No. 4,093,991), Beecroft, et al. (U.S. Pat. No. 7,236,243), Cheng, et al. (U.S. Pat. No. 8,525,996) and Barron, et al. (U.S. Pat. No. 9,713,223).

BRIEF SUMMARY OF THE INVENTION

The device herein described examines light in the range from 350 nm to 780 nm obtained from either a remote source or an internal source. That light may go directly to its spectrometer module or pass through a sample or be reflected from a sample while en-route to its spectrometer module. The spectrometer module's output is then analyzed utilizing an algorithm in the device's computer to find the spectral irradiance of that received light in order to determine its characteristics. This compact device then functions as a transmission spectrometer, reflectance spectrometer or spectroradiometer which will measure spectral irradiance, illuminance, chromaticity, correlated color temperature, color rendering, flicker and equivalent melanopic lux of the light source or sample.

BRIEF DESCRIPTION OF THE DRAWING

FIG. 1 shows a perspective view of the spectroradiometer device described above.

REFERENCE NUMERALS IN DRAWINGS

1. Transmittance/Reflectance rocker key
2. Calibrate/Reset push button key
3. Read value push button key
4. Display screen
5. Light level indicating light emitting diodes
6. USB connector interface to another computing device
7. DC power input
8. Gap for placement of the sample or of the remote light beam director
9. Local visible and UV light sources
10. Remote light beam director
11. Reflector
12. Pivot
13. Spectrometer module
14. Computer
15. Sample

DETAILED DESCRIPTION OF THE INVENTION

The device contains a plurality of visible and UV sources (9) whose light flux is controlled electrically (7) by its computer (14) or microcontroller. Within the device, this light flux is directed into a spectrometer module (13), either directed (1) through (8) a sample (15) or reflected off of a sample before going into the device's spectrometer module. For calibration (2) or source evaluation (3), light flux from a remote, uncontrolled source such as the sun may also be directed (10, 11) into that spectrometer module. The computer operates the spectrometer module, such as a Hamamatsu C12666MA, which takes the input light flux and provides spectral intensity information as a function of wavelength. The device's computer then utilizes algorithms to analyze that spectral intensity information to provide the spectral irradiance of the light by comparing it with that of the spectral intensity produced by a remote source of known irradiance, such as the sun, which it has stored in its memory. If the light came from the local sources (9) controlled by the computer, then a comparison is made between the spectral irradiance with and without the sample in order to produce a transmission spectrum of the sample or a reflectance spectrum from the sample. The computer further uses algorithms to analyze the spectral irradiance to provide color information about the light that illuminated the spectrometer module.

For measurement of the irradiance of an unknown light source, initially use the sun as a calibration source. The sun's light flux is directed (10) into the spectrometer module. For this sun scan, a module scan speed that produces a measurable number of counts for solar illumination on the pixels is used. Next, a dark current scan is run with all light blocked to the module while using the same scan speed as for the solar spectrum. The algorithm takes the difference between sun value and dark value for each pixel and generates a set of pixel conversion factors to convert each pixel's difference value to the value of the solar spectrum for that wavelength using the solar spectral irradiance found in American National Standard ANSI Z80.3-2001 table 3: "Solar Irradiation at Sea Level with Surface Perpendicular to the Sun's Rays, m=2".

To measure the irradiance from an unknown source, the algorithm adjusts the scan speed progressively slower and slower until the pixels are again illuminated to the approximate amount as the solar spectrum. This spectrum is scaled using the multiplicative effect of the scan speed and the ratio of the pixel's present count difference (value less dark value) to that of the solar spectrum. The resultant spectrum will be that source's spectral irradiance in Watts/m² micrometer, at the distance of the spectroradiometer from that source. This spectrum is also referred to as the SPD(LAMBDA) or spectral power distribution of that source as a function of wavelength.

To find the illuminance at the spectroradiometer due to an unknown light source, the algorithm uses $$E=683*\{SUMMATION[SPD(LAMBDA)][V(LAMBDA)][DELTA\ LAMBDA]\}$$

where DELTA LAMBDA is 0.01 micrometer summing from 380 nm to 780 nm and the V(LAMBDA) come from appendix 7 of "The Reproduction of Colour", Sixth Edition by R. W. G. Hunt. The units are Lux.

The device, in addition to providing the spectral irradiance of a remote source and reflectance and transmission spectra from a sample, will provide information (4, 5) on the remote source's illuminance, chromaticity, correlated color temperature, color rendering and equivalent melanopic lux. The chromaticity is provided in several formats: (X, Y, Z) or (x, y, Y) or (L*, a*, b*) or others. The device is by no means limited to these features, since knowledge of the spectral irradiance of a source allows calculation of all of the chromatic and intensive parameters associated with the source. Additionally, the interaction of that light with the sample enables calculation of the chromaticity, correlated color temperature, color rendering and equivalent melanopic lux of that light after having interacted with the sample.

Although the computer internal to the device is able to perform the additional calculations to be described below, alternatively, a user can employ another computing device to interface with the device computer. The device's I/O interface (6) can comprise any other device that enables its computer to communicate with one or more other computing devices over a network. The network can comprise various combinations of communication links. Thus, more complex calculations may be carried out on other linked-in computing devices, using software supplied along with the spectroradiometer device.

For the chromaticity of the unknown light source, the algorithm used is:

$$X=(K)SUMMATION[SPD(LAMBDA)][x(LAMBDA)]DELTA\ LAMBDA$$

$$Y=(K)SUMMATION[SPD(LAMBDA)][y(LAMBDA)]DELTA\ LAMBDA$$

$$Z=(K)SUMMATION[SPD(LAMBDA)][z(LAMBDA)]DELTA\ LAMBDA$$

where DELTA LAMBDA is 0.01 micrometer summing from 380 nm to 780 nm and x(LAMBDA), y(LAMBDA), z(LAMBDA) come from the CIE (1931) Standard Observer 2 Spectral Tristimulus values of equal energy spectrum, found in American National Standard ANSI Z-80.3-2001, Table 2. K is a constant used to normalize Y to a value of 100. The (x, y, Y) are found from the X, Y and Z using: x=X/(X+Y+Z); y=Y/(X+Y+Z). The CIE 1960 (u, v) values for the unknown source are found using:

$$u=4X/(X+15Y+3Z)\ \text{and}\ v=6X/(X+15Y+3Z)$$

The CIE L*, a*, b* are found in the usual way as taught in "Color Image Segmentation for Medical Images using L*, a*, b* Color Space" by Janakkumar and R. S. Anand from X, Y, Z. For reference to a D65 illuminant, where $X_n=0.9504$, $Y_n=1.0000$, $Z_n=1.0890$, $$x_r=X/0.9504$$

$$y_r=Y$$

$$z_r=Z/1.0890$$

and if $x_r$ is larger than 0.008856, then $f_x=(x_r)^{1/3}$, otherwise, $f_x=7.7870(x_r)+0.13793$;

and if $y_r$ is larger than 0.008856, then $f_y=(y_r)^{1/3}$, otherwise, $f_y=7.7870(y_r)+0.13793$;

and if $z_r$ is larger than 0.008856, then $f_z=(z_r)^{1/3}$, otherwise, $f_z=7.7870(z_r)+0.13793$;

and finally, $L^*=116f_y-16$; $a^*=500(f_x-f_y)$; $b^*=200(f_y-f_z)$.

The algorithm used to estimate the Correlated Color Temperature of the unknown light source is the approximation from "Correlated Color Temperature as an Explicit Function of Chromaticity Coordinates" taught by C. S. McCamy:

$$CCT=-449n^3+3525n^2-6823.3n+5520.33\ \text{where}$$
$$n=(x-0.3320)/(y-0.1858)$$

To find the Color Rendering Index for the unknown light source, which is assumed close to being white, the algorithm used convolves the unknown light source with each of the 8 Munsell color swatches that CIE used for color rendering as taught in "Light Sources and Color Rendering" by Dorothy Nickerson:

($TCS_1$: 7.5R6/4; TCS2: 5Y6/4; TCS3: 5GY6/8; TCS4: 2.5G6/6; TCS5: 10BG6/4; TCS6: 5PB6/8; TCS7: 2.5P6/8; $TCS_8$: 10P6/8).

$$X_i=(K)SUMMATION[SPD(LAMBDA)][x(LAMBDA)][TCS_i(LAMBDA)][DELTA\ LAMBDA]$$

$$Y_i=(K)SUMMATION[SPD(LAMBDA)][y(LAMBDA)][TCS_i(LAMBDA)][DELTA\ LAMBDA]$$

$$4=(K)SUMMATION[SPD(LAMBDA)][z(LAMBDA)][TCS_i(LAMBDA)][DELTA\ LAMBDA]$$

where DELTA LAMBDA is 0.01 micrometer summing from 380 nm to 780 nm and x(LAMBDA), y(LAMBDA) and z(LAMBDA) come from the CIE (1931) table mentioned in paragraph [0011]. Here, K normalizes each $Y_i$ to 100, and again as in paragraph [0011]

$$u_i=4X_i/(X_i+15Y_i+3Z_i)\ \text{and}\ v_i=6X_i/(X_i+15Y_i+3Z_i)$$

Next, the algorithm follows the procedure taught in "Method of Measuring and Specifying Colour Rendering Properties of Light Sources": Vienna (Austria): CIE Publication No. CIE 13.3-1995 in order to produce the color rendering index value.

Flicker determination requires a very different use of the spectrometer module. The algorithm scans the spectrometer module at rates higher than the human eye's flicker fusion frequency of 20-40 Hz while still producing measurable irradiance readings. The change in the reading of the output of the brightest pixel over a period of one second indicates the presence of flicker. The amount of flicker is found to be the difference range, maximum reading less minimum reading for that pixel, divided by the maximum reading over that one second's readings expressed as a percentage. This technique is used uniquely in this device.

Equivalent melanopic lux is computed using the algorithm $$E_{melanopic}=(683)\{SUMMATION[SPD(LAMBDA)][V_z(LAMBDA)][DELTA\ LAMBDA]\}$$

where SPD(LAMBDA) is the spectral irradiance as a function of wavelength (LAMBDA), DELTA LAMBDA is 0.01 micrometer summing from 380 nm to 780 nm and the $V_z$(LAMBDA) come from ANSI Z-80.3-2001 table 2 for y(LAMBDA), but with each wavelength number decreased by 70 nm so that the $V_z$(LAMBDA) reading for 480 nm is the y(LAMBDA) reading for 550 nm or 0.995. The measurement units are Melanopic Lux. This technique is used uniquely in this device.

The invention claimed is:

1. A compact spectroradiometric device for measuring spectral irradiance of a light source whose light flux will be observed, comprising: a director whose reflector collimates light flux entering the device from a source remote to the device; a computer controlled spectrometer module which takes that input light flux and provides light intensity information as a function of wavelength; this computer also uses an algorithm to convert this light intensity information into the spectral irradiance, illuminance, chromaticity, correlated color temperature, color rendering, flicker, and equivalent melanopic lux of the source; flicker is measured in this device by scanning the spectrometer module at rates higher than the human eye's flicker fusion frequency of 20-40 Hz while still producing measurable irradiance readings; a change in the reading of the output of the brightest pixel over a period of one second indicates the presence of flicker; the amount of flicker is found to be the difference range, maximum reading less minimum reading, divided by the maximum reading over that one second's readings expressed as a percentage; a display device to output this information; a key to input data to the device; when the source is of known spectral irradiance and color characteristics, such as the sun, then that spectral irradiance would be used to calibrate the device.

2. The device in claim 1, wherein the device additionally containing a plurality of visible and UV light sources within the device whose light flux is controlled electrically by the computer; this light flux is then collimated and illuminates the spectrometer module either directly or after transmission through or reflection from a sample; the computer then uses additional algorithms to convert the light intensity information from the spectrometer module into the spectral irradiance, illuminance, chromaticity, correlated color temperature, color rendering, and equivalent melanopic lux of those light sources or of those light sources after having been transmitted through or reflected from the sample.

3. The device in claim 2, wherein the device is networked with an external computational platform which will use additional algorithms, supplied with the device to be installed in that additional computational platform, to provide information on the characteristics of the source or sample's spectral irradiance such as but not limited to its illuminance, chromaticity which is provided in several formats: (X, Y, Z) or (x, y, Y) or (L*, a*, b*) or other color schema, correlated color temperature, color rendering, flicker, or equivalent melanopic lux, this later herein defined as Emelanopic=683* {summation [SPD(LAMBDA)][V2 (LAMBDA)] [DELTA LAM BDA]} where SPD (LAMBDA) is the spectral irradiance as a function of wavelength (LAMBDA), DELTA LAMBDA is 0.01 micrometers and the VZ(LAMBDA) come from ANSI Z-80.3:2001 table 2 for y(LAMBDA), but with each wavelength number decreased by 70 nm so that the VZ(LAMBDA) reading for 480 nm is the y(LAMBDA) reading for 550 nm or 0.995; the sum is from 380 nm to 780 nm.

* * * * *